Dec. 2, 1941.  M. J. LACHANCE  2,264,576
WEIGHING SCALE ILLUMINATING MEANS
Filed Dec. 29, 1939   2 Sheets-Sheet 1
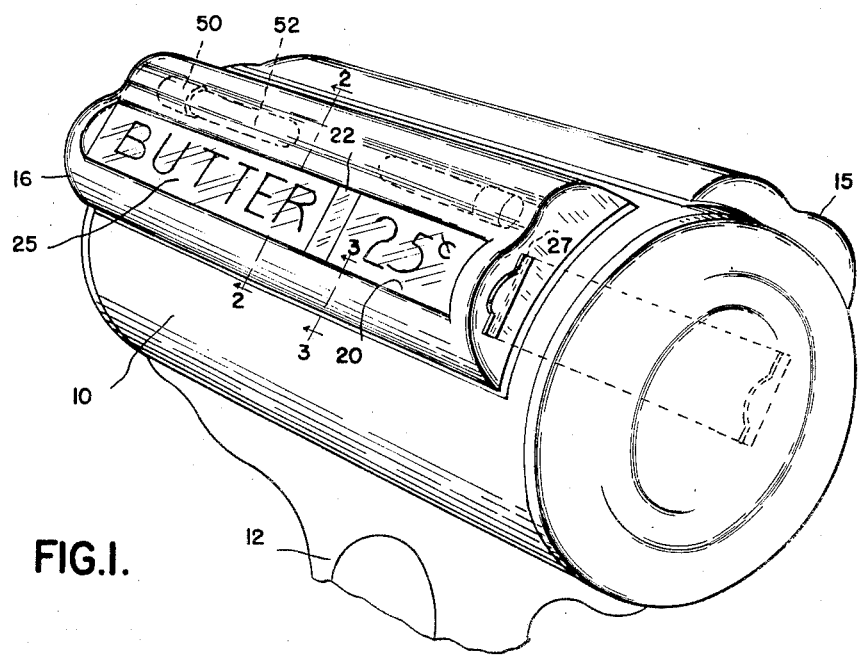
FIG.1.
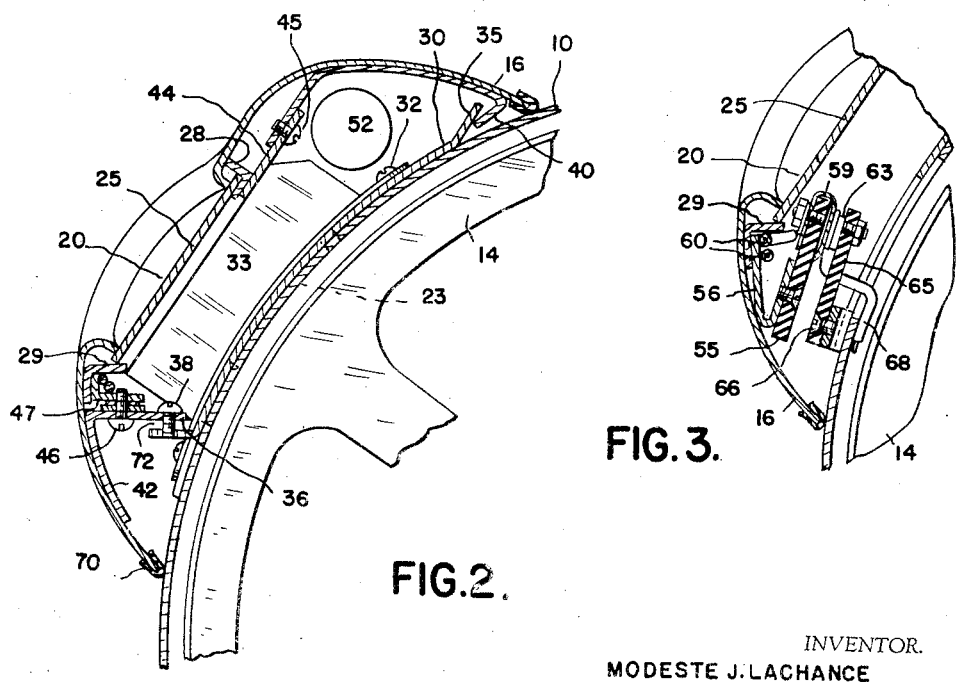
FIG.2.
FIG.3.
INVENTOR.
MODESTE J. LACHANCE
BY
ATTORNEYS Dec. 2, 1941.                M. J. LACHANCE                2,264,576
                       WEIGHING SCALE ILLUMINATING MEANS
                         Filed Dec. 29, 1939          2 Sheets-Sheet 2
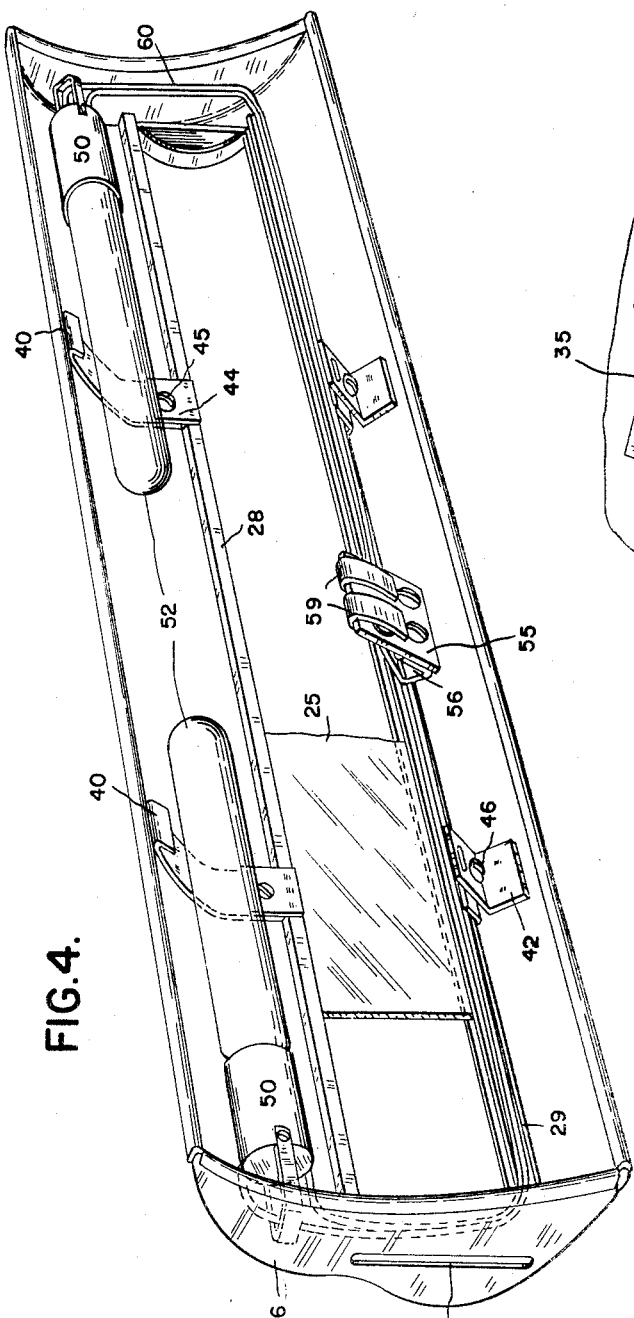
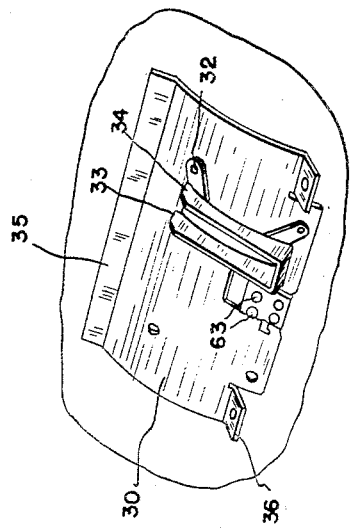
INVENTOR.
MODESTE J. LACHANCE
BY
ATTORNEYS Patented Dec. 2, 1941

2,264,576

UNITED STATES PATENT OFFICE 2,264,576

WEIGHING SCALE ILLUMINATING MEANS

Modeste J. Lachance, Louisville, Ky., assignor to Walter F. Stimpson, Louisville, Ky.

Application December 29, 1939, Serial No. 311,590

4 Claims. (Cl. 240—2.11)

This invention relates to weighing scales, and particularly to improvements in the chart housing and frame construction of weighing scales of the cylindrical chart computing type.

An important object of the invention is to provide an improved supplemental frame, and novel and improved supporting means therefor, whereby the frame is secured to the chart housing in a manner which renders its securing means invisible. A related object is to provide such a supplemental frame which serves as a support for a removable and replaceable advertising panel, adapted to display any desired advertising matter in a most prominent manner, assuring observation thereof by customers of the scale user, and permitting such advertising matter to be changed at will.

Another object is to incorporate in such frame illuminating means for the advertising panel, and to provide a novel transparent and shielded sight portion, adapted to register with an opening in the chart housing and through which weight indications upon the chart may be observed, the entire assembly being so constructed that all of the aforementioned and other parts, except the portion of the chart which is visible through the sight opening, are entirely concealed from view when the parts are assembled in the normal manner, while the securing means for the frame, the light bulbs constituting the illuminating means, and other parts to which access is at times necessary, are nevertheless conveniently accessible when the advertising panel is removed.

Another object is to incorporate novel electrical contact means for conveying electric current to the illuminating means housed in the supplemental frame, disconnection of which contact means is automatically effected by removal of the frame from the chart housing.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of the upper portion of a weighing scale incorporating the present invention.

Figures 2 and 3 are cross sectional views thereof taken substantially on the lines 2—2, and 3—3, respectively, of Figure 1, and looking in the direction of the arrows.

Figure 4 is a perspective view of the rear of the supplemental frame within which the advertising means is mounted; and Figure 5 is a fragmentary perspective view of the frame-supporting means carried by the chart housing.

Referring now to the drawings:

Reference character 10 designates generally the chart housing of a weighing scale of the cylinder computing type. The chart housing is carried by and at the top of a column 12 which is in turn supported upon a base (unshown). The precise details of construction of the scale will not be considered, inasmuch as they are unimportant insofar as the present invention is concerned, as will readily be apparent to those skilled in the art. The construction illustrated will in fact be recognized as quite conventional insofar as the arrangement of the chart supporting and housing means and the rotatable chart 14 is concerned.

The chart may be observed from the front, by the store keeper or other user of the scale, through a window or lens frame assembly 15. Upon the rear or customer side of the chart housing a similar frame assembly 16 is provided, having an elongated opening 20 therein extending substantially the full length of the chart housing. The opening 20 is normally closed by a translucent panel 25 of light diffusing and nontransparent character, having a small transparent section 22 so located as to align with weight indications (undesignated) on the chart, and with a suitably positioned opening 23 in the chart housing, when the panel is in place. A sight opening is thereby provided through which the customer may observe the weight graduations. The panel is adapted to be inserted and removed through a slot 27 in one end of the frame 16, being slidable between angular sheet metal guides 28, 29, welded or otherwise secured to the interior of the frame upon either side of the opening 20. The panel 25 may be of glass or a suitable plastic material, having a surface which may be marked with crayons or painted upon with water-soluble paints or the like, to enable the merchant to apply, remove and change the advertising matter at will.

The frame assembly is removably held upon the chart housing by means of a sheet metal bracket 30, shaped conformably to the chart housing and fastened thereto, as by screws 32. Flange portions 33, 34, formed as a unit and separately held by the screws 32 which hold the bracket 30, frame the sight opening in the space between the transparent window 22 in the advertising panel 25 and the opening 23 in the chart housing, concealing from view the mechanism inside the frame, which might otherwise be observed by looking obliquely through the transparent portion of the panel. The upper edge of the bracket 30 is angularly turned outwardly, as indicated at 35, while at either end of its lower edge angularly out-turned portions 36 are also provided. The ears 36 are provided with tapped holes (undesignated) adapted to receive the screws 38. Welded or otherwise secured to the interior of the frame near its top are a pair of hooks 40, lying flat against the interior thereof except at their ends, which are bent downwardly to enable them to overengage the flange 35 of the bracket plate 30, as best shown in Figure 2. A pair of inwardly extending brackets 42 are also secured to the interior of the lower portion of the frame, such brackets having perforations (undesignated) adapted to register with the aforementioned tapped openings in the out-turned ears 36, to permit passage of the screws 38 therethrough. The track 28 will be seen to be supported by hook portions 40, being welded to attaching plates 44, which are in turn fastened to the hooks by means of screws 45. Lower guide track 29 is similarly held by means of screws 46 and supporting angle brackets 47 to which the track is welded. Screws 38 are accessible through the opening 22 when the panel 25 is removed, and it will be seen that when these screws are removed, the frame may be attached to and removed from the chart housing simply by engaging and disengaging the hook portions 40 from the flange 35, yet all of the securing means are completely concealed from view when the advertising panel 25 is in place.

Also carried by and within the frame are a pair of lamp sockets 50 for the illuminating light bulbs 52. Current from the bulbs is supplied through spring contacts, which are separated from the current source by the act of removing the frame from the chart housing. An insulating contact block 55 is attached to the interior of the frame by means of a bracket 56, carried by guide 29, and a pair of spring contact elements 59 attached to the contact block project inwardly therefrom. The lead wires 60 by which the light bulbs are supplied are attached to the contacts 59. Co-operating contact elements 63 are attached to and project outwardly from a correspondingly positioned insulating contact block 65 attached to the chart housing, as by means of screws 66. Feed wires 68 attached to contact members 63 are connected to a suitable source of electric current, and the contact elements 59, 63 will be seen to be positioned to engage one another properly to complete the circuit to the bulbs when the frame is applied to the chart housing in the manner shown.

The bulbs may of course be arranged to be illuminated either continuously, or only when the scale is in operation. The upper securing means for the frame, comprising the hooks 40 and cooperating and attached parts, and all parts within and at the top of the frame, will be seen to lie entirely behind the light bulbs, so that light projected downwardly from the latter may be thrown directly against the interior of the advertising panel 25 without shadow or other interference.

Gasketing 70 of soft rubber or the like extends around the edges of the frame to protect the finish of the chart housing. The relationship between the hooked portion 40 and the flange 35 at the top of the assembly, and lug and bracket portions 36, 42 at the bottom of the assembly is such as that as the screws 38 are tightened the frame assembly is forced more tightly against the chart housing. For this purpose a gap, indicated at 72, is left between portions 42—36, and the inclination of the upper flange 35 of the bracket 30 is such that the frame is forced inwardly as it is drawn downwardly by tightening of the screws, as will readily be apparent upon inspection of Figure 2. The screws 38 also act in a direction to urge the lower portion of the frame inwardly against the chart housing, as well as downwardly.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a weighing scale construction of the variety having a substantially horizontally disposed cylindrical computing chart and a chart housing enclosing the same, said chart housing having an opening therein through which weight graduations on the chart may be observed, a frame adapted to be secured to said chart housing and having an open face extending substantially the full length thereof, said opening in the chart housing being enclosed by said frame, a translucent panel removably arranged over said open face, said panel having transparent section adapted to register with said opening in the chart housing, and means for securing said frame to said chart housing, comprising inclined holding portions depending from the interior of said frame near the top thereof, abutment means carried by the chart housing behind which said holding portions are engageable to retain the frame upon the chart housing, and means for securing a lower portion of the frame to the chart housing, said last-mentioned securing means when tightened drawing the frame in a direction to cause said inclined holding portions to act as cam means to force the frame against the chart housing.

2. In a weighing scale construction of the variety having a substantially horizontally disposed cylindrical computing chart and a chart housing enclosing the same, said chart housing having an opening therein through which weight graduations on the chart may be observed, a frame adapted to be secured to said chart housing and having an open face at least a portion of which is adapted to register with said opening in the chart housing, a translucent panel removably arranged over said open face, and means for securing said frame to said chart housing, comprising inclined holding portions depending from the interior of said frame near the top thereof, abutment means carried by the chart housing behind which said holding portions are engageable to retain the frame upon the chart housing, and means for securing a lower portion of said frame to said chart housing, said last-mentioned securing means when tightened being arranged to draw the frame both downwardly and inwardly against the chart housing, said depending holding portions being inclined in a direction to act as cam means tending to force the frame against the chart housing when said securing means is tightened.

3. Means as set forth in claim 2 in which said securing means for the lower portion of the frame is also arranged within the frame and behind said panel and is accessible only by removal of the panel from its normal position covering the open face thereof.

4. In a weighing scale construction of the variety having a substantially horizontally disposed cylindrical computing chart and a chart housing enclosing the same, said chart housing having a sight opening therein, a frame adapted to be secured to said chart housing and having an open face at least a portion of which is adapted to register with said sight opening, a translucent panel removably arranged over said open face, and means for securing said frame to said chart housing, comprising inclined holding portions depending from the interior of said frame near the top thereof, abutment means carried by the chart housing, behind which abutment means holding portions are engageable to retain the frame upon the chart housing, and means for securing a lower portion of said frame to said chart housing, said last-mentioned securing means comprising screw means arranged within said frame and behind said panel and acting in a downward and inward direction when tightened, said depending holding portions being inclined in a direction to act as cam means tending to force the frame against the chart housing when the screw means is tightened.

MODESTE J. LACHANCE.